(No Model.)
J. M. CORNELL.
EXPANDING BOLT.
No. 282,501. Patented Aug. 7, 1883.
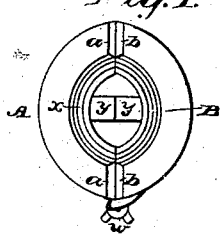
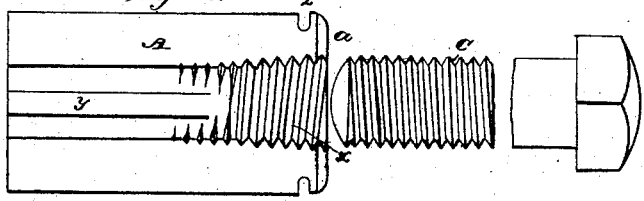
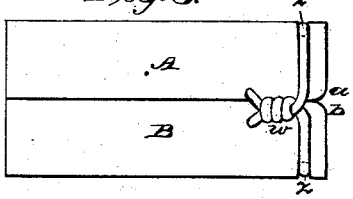
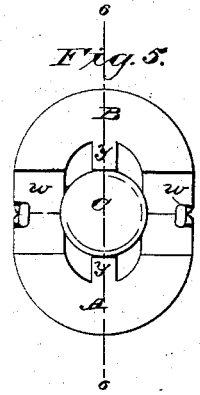
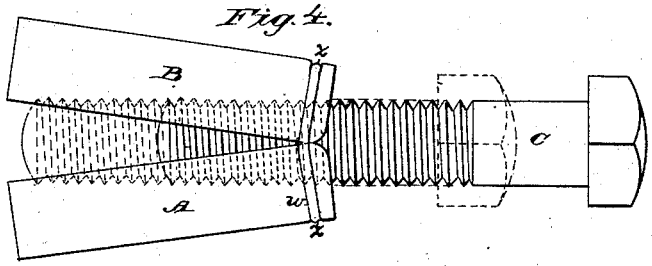
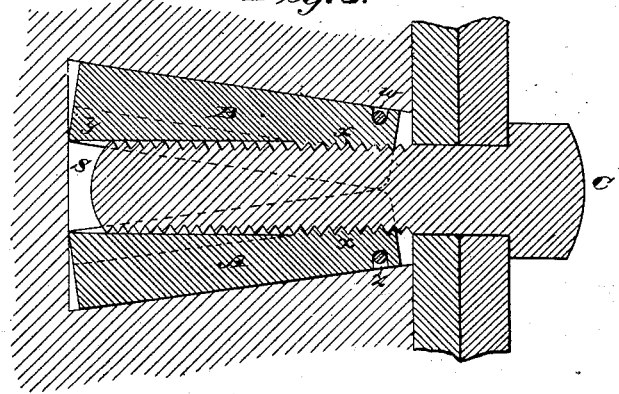
WITNESSES
INVENTOR
John M. Cornell,
per
Jas. L. Ewin
ATTORNEY

UNITED STATES PATENT OFFICE.

JOHN M. CORNELL, OF NEW YORK, N. Y.

EXPANDING BOLT.

SPECIFICATION forming part of Letters Patent No. 282,501, dated August 7, 1883.

Application filed April 21, 1883. (No model.)

*To all whom it may concern:*

Be it known that I, JOHN M. CORNELL, a citizen of the United States, residing at New York, in the State of New York, have invented a new and useful Improvement in Expanding Bolts, of which the following is a specification.

This invention relates to improvements in the construction of expanding bolts for use in attaching iron to stone or brick work in architectural and like structures.

The objects of the present invention are, first, to adapt a simple longitudinally-divided bolt shell or nut to be expanded by an ordinary screw-bolt as the bolt proper, and at the same time to afford the latter ample independent movement for tightly clamping attached iron-work of different thicknesses without the aid of the additional parts commonly used; and, secondly, to prevent a bolt shell or nut so expanded from collapsing under strain.

A sheet of drawings accompanies this specification as part thereof.

Figure 1 of these drawings is an end view of the bolt shell or nut of my expanding-bolt. Fig. 2 is an elevation of one part of the same with the screw-bolt in position to enter. Fig. 3 is an edge view of the unexpanded bolt shell or nut. Fig. 4 is a like view of the expanding bolt complete, with the bolt shell or nut expanded and the screw-bolt in different positions. Fig. 5 is an end view of the expanding bolt as seen in Fig. 4, and Fig. 6 is a longitudinal section on the line 6 6, Fig. 5, showing the same as in use.

Like letters of reference indicate corresponding parts in the several figures.

This expanding bolt comprises only three main parts, two of which, A B, constitute a longitudinally-divided bolt shell or nut of peculiar construction, and the third, C, is an ordinary screw-bolt of a standard size, to which the said bolt shell or nut is fitted. The parts A B are identical with each other in size and general form, and may, in the rough, be castings in iron or brass from one and the same pattern. Each of these parts is a longitudinal section of a hollow cylinder, and they form together, when the nut is not expanded, a somewhat flattened cylinder, as represented by Figs. 1 and 3. This adapts the nut to enter freely an inwardly-flaring socket, S, Fig. 6, cut to fit it in its expanded form, and to expand therein without binding. Internally the nut has at its outer end a short inwardly-tapering screw-tapped expanding section, $x$, formed by clamping the parts A B solidly in the positions which they are to assume when expanded, as seen in Figs. 4, 5, and 6, and reaming out and tapping said expanding section to fit the screw-bolt C. As the screw-bolt is subsequently screwed into the nut when the latter is within the said socket S, the said nut is expanded to said final shape, and when the screw-bolt has reached the inner limit of said expanding section $x$, as shown in full lines in Fig. 4, the expansion is complete. The screw-bolt may now be screwed in to the limit of its thread, if required, as shown in dotted lines in Fig. 4, without danger of bursting the nut or socket, or it may be screwed in to any less extent (being in all cases adapted to extend within said expanding section) without impairing the security of the fastening. Different thicknesses of iron-work, I, Fig. 6, may consequently be tightly attached with equal facility by one and the same size of expanding bolt, while variations in the sockets S are compensated for by the same means. Longer or shorter screw-bolts may of course be used, as occasion may require, and the relative length of the expanding section may vary in nuts of a given length. Beyond each expanding section $x$, each of the parts A B is provided with a longitudinal supporting-incline, $y$, located centrally within its longitudinal recess, and consequently in the plane of expansion. These inclines have no function in the expanding operation; but, as clearly seen in Fig. 6, resting upon the thread of the screw-bolt C, they afford solid support to all that portion of each part of the nut beyond said expanding section $x$, and tend to preclude collapsing. The effective inner surfaces of said inclines may be formed or trued by reaming out the inner end of the expanded nut, while it is clamped for reaming out and tapping its outer end, as aforesaid.

To provide in a simple and effective way for keeping the parts A B of each nut together prior to their use, for aligning the segmental threads in the expanding section $x$ for the reception of the screw-bolt C, and for preventing displacement of either part while loose within the socket S, a peripheral groove, $z$, is provided near the outer end of the nut, and within this a circumferential wire, $w$, is tied, the inner surfaces of the respective parts A B being beveled at their outer extremities, as represented at $ab$, to accommodate them to this location of the centers of movement. A suitable hinge may be otherwise formed in any approved way.

Having thus set forth my said invention, I claim as new—

1. An expanding bolt composed of a longitudinally-divided bolt shell or nut and an ordinary screw-bolt, the former provided with a short internally screw-tapped expanding section, in penetrating which the said bolt shell or nut is fully expanded by said screw-bolt, substantially as herein specified.

2. In an expanding bolt, a longitudinally-divided bolt shell or nut composed of two parts, A B, hinged together and provided internally with a short inwardly-tapering screw-tapped expanding section, $x$, at its outer end, and constructed with internal longitudinal supporting-inclines, $y\,y$, beyond said expanding section, in combination with a screw-bolt, C, substantially as shown and described, for the purposes set forth.

JOHN M. CORNELL.

Witnesses:
  H. C. TUNIS,
  H. W. REDFIELD.